United States Patent [19]

Richtermeier

[11] 4,018,475
[45] Apr. 19, 1977

[54] DOOR SYSTEM FOR VEHICLES
[75] Inventor: Heinrich Richtermeier, Barnstorf, Germany
[73] Assignee: Volkswagenwerk Aktiengesellschaft, Wolfsburg, Germany
[22] Filed: Apr. 17, 1975
[21] Appl. No.: 569,101
[30] Foreign Application Priority Data
May 14, 1974 Germany ............... 2423296

[52] U.S. Cl. .................. 296/28 R; 49/400; 296/146
[51] Int. Cl.² ........................................ B60J 5/04
[58] Field of Search ............ 296/28 R, 28 H, 146; 49/400, 36; 292/Dig. 23

[56] References Cited
UNITED STATES PATENTS

| 2,116,330 | 5/1938 | Tjaarda | 296/28 R |
| 2,493,566 | 1/1950 | Bauer | 49/400 |
| 2,532,203 | 11/1950 | Stephenson | 296/28 R |
| 2,639,938 | 5/1953 | Pickard | 296/28 R |
| 2,860,911 | 11/1958 | Cotter | 296/28 R |
| 3,233,931 | 2/1966 | Peras | 292/DIG. 23 X |
| 3,944,278 | 3/1976 | Takahashi et al. | 296/28 R X |

FOREIGN PATENTS OR APPLICATIONS

| 243,106 | 10/1965 | Austria | 49/400 |
| 2,045,875 | 3/1972 | Germany | 296/28 R |
| 1,214,769 | 12/1970 | United Kingdom | 296/146 |
| 640,870 | 8/1950 | United Kingdom | |

Primary Examiner—Robert J. Spar
Assistant Examiner—Winston H. Douglas
Attorney, Agent, or Firm—Brumbaugh, Graves, Donohue & Raymond

[57] ABSTRACT

A door system for motor vehicles is designed to prevent jamming of the door in the event of a collision. The end of the door that retains the door lock is constructed so that an opening or slit is formed between it and the neighboring door pillar. This opening (in top view) runs diagonally to the plane of the door and ends near the outer surface of the door in an offset in the pillar and a flange in the outer surface of the door. A portion of the flange perpendicular to the outer door plate faces an outer region of the door pillar offset with a clearance. This clearance is always made wider than the diagonal opening in order to prevent jamming of the door during a longitudinal impact on the vehicle.

4 Claims, 1 Drawing Figure

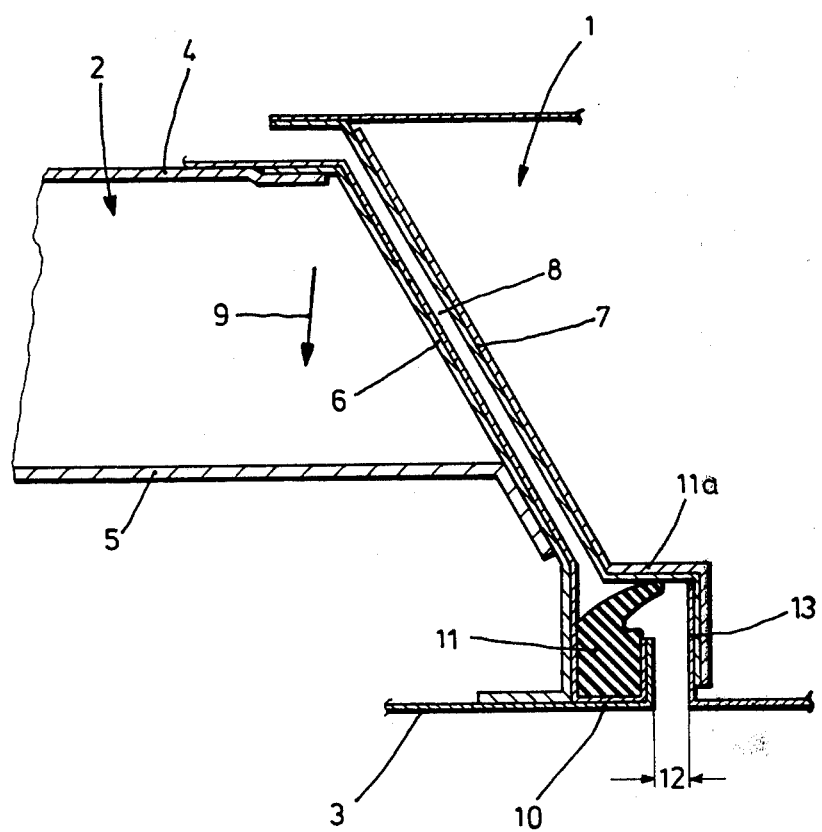

DOOR SYSTEM FOR VEHICLES

BACKGROUND OF THE INVENTION

This invention relates to vehicle doors and, more particularly, to motor vehicle doors designed to prevent jamming in the event of a collision.

Conventional door arrangements are shown in German Pat. No. 903,064, 63c, 44 and British Pat. No. 640,870. These patents disclose that the end of a conventional door, that holds the door lock, has a diagonal face that mates with a diagonal face of a door pillar. As a result, the width of the door increases with increasing distance from the vehicle's longitudinal axis, i.e. in the direction in which the door opens. However, the gap between these diagonal faces when the door is closed is larger than the space between the outer door panel and the pillar. Consequently, when the vehicle is impacted along its longitudinal axis, e.g. during a collision, the outer door panel will become crushed before the diagonal faces meet and it will likely jam the door lock. This could cause the passengers to be trapped in the vehicle.

SUMMARY OF THE INVENTION

The present invention is directed to reducing the possibility of a door jam during a collision by assuring that the end face of the door makes contact with the door pillar before the outer door panel does.

In an illustrative embodiment of the invention a vehicle door is provided with inner and outer door plates and an end face plate that in top view is diagonal to the plane of the door. The diagonal plate is arranged so that the width of the door increases for increasing distances from the longitudinal axis of the vehicle. This end face plate is on the end of the door that retains part of the door lock and it mates with a diagonal face of the door pillar that holds the other part of the door lock. The diagonal surfaces of the end face plate and the pillar form a diagonal slit or opening that is altered near the outer door plate by an offset in the pillar surface and a flange on the outer door plate. A portion of the flange perpendicular to the outer door plate faces an outer region of the offset across a clearance that is larger than the diagonal opening.

The present invention is based on the discovery that the diagonal surfaces of the door and pillar tend to reduce the chances of a door jam during a collision. This is true because the diagonal pillar face presents an increasing space for the door as it is moved to its open position. Also, when the clearance between the offset and the flange is greater than the diagonal opening, the possibility of the outer door plate becoming jammed in the door lock is reduced. This dimensioning of the door system ensures that in the event of an impact, the surfaces of the door and door pillar that define the diagonal opening come to bear upon each other before the outer door plate can be damaged. As a result of the particular design of the end plate and the pillar, a slanting pressure is applied to the door forcing it outwards, without this outward motion being hindered by contact between the flange and the region of the offset of the door pillar facing it.

BRIEF DESCRIPTION OF THE DRAWINGS

The foregoing and other features of the present invention will be more readily apparent from the following detailed description and drawing of a top view of the lock end of a door and a pillar arranged according to an illustrative embodiment of the invention.

DESCRIPTION OF AN EXEMPLARY EMBODIMENT

In the figure only the lock end region 2 of the door and the facing region of the door pillar 1 are illustrated. As is customary, the door contains an outer door plate 3, and inner door plate 4 and a door-reinforcing member 5. The reinforcing member 5 has its bent end region connected with a door end face plate 6, for example by welding. The face plate 6 and the facing surface 7 of the door pillar 1 enclose an opening or slit 8, which, in the top view shown, runs diagonally to the plane of the door. This diagonal opening is, of course, selected so that the opening of the door, by moving the door edge 2 in the direction of the arrow 9, is possible.

The end of the outer door plate 3 forms a flange 10, which in this embodiment is designed as a mounting for a door seal 11. When the door is in its closed position the seal 11 rests against an offset 11a of the door pillar 1 and seals the opening between the door and the pillar. Part of the offset 11a is parallel to the plane of the door and a part 13 is perpendicular to the door plane. Likewise, part of flange 10 is perpendicular to the door plane and defines a clearance 12 with region 13 of the offset. Pursuant to the invention, the clearance 12 is made greater in width than the opening 8, so that during an impact, causing movement of the door relative to the door pillar 1, the components 6 and 7 come to bear upon each other before the flange 10 and the offset region 13 can come into contact. Therefore, the slope of the door produced by the inclination of components, 6 and 7 will force the door open and this motion will not be hindered by the flange 10 and the door pillar. Unintentional opening of the door in the case of an impact is prevented by the door lock. Since, such locks are well known, no lock is illustrated in the figure.

While the invention has been particularly shown and described with reference to a preferred embodiment thereof, it will be understood by those skilled in the art that various changes in form and details may be made therein without departing from the spirit and scope of the invention.

I claim:

1. A door system for vehicles, e.g. motor vehicles, comprising:
   a door with an inner and an outer door surface and an end face plate connecting them at an end of the door adapted to accept a door lock, said end face plate running diagonally with respect to said door surfaces in top view over at least part of its length such that the width of the door increases in the direction from said inner door surface towards said outer door surface, said outer door surface having a flange region adjacent said end face plate and projecting beyond it; and
   a pillar with a diagonal face running substantially parallel to said end face plate and defining a diagonal gap between said pillar face and said end face plate, which gap has a width measured substantially parallel in top view with respect to said door surfaces, said pillar further comprising an outer region that forms a clearance with said flange region measured substantially parallel in top view with respect to said door surfaces, said clearance being dimensioned significantly wider than the width of said gap.

2. A door as claimed in claim 1, further including a seal mounted on said flange and resting on said outer region of said pillar when the door is in the closed position.

3. A door as claimed in claim 1, in which said outer region includes an offset with a region substantially parallel to the plane of the door and a region substantially perpendicular to the plane of the door.

4. A door as claimed in claim 3, in which said flange region includes a portion substantially parallel to the plane of the door and a region substantially perpendicular to the plane of the door, said clearance being formed by the perpendicular regions of said offset and said flange.

* * * * *